United States Patent
Curtis et al.

(10) Patent No.: US 11,752,843 B2
(45) Date of Patent: Sep. 12, 2023

(54) VEHICLE DOOR SYSTEM

(71) Applicant: Ford Global Technologies, LLC, Dearborn, MI (US)

(72) Inventors: Chris Curtis, Leverkusen (DE); Karl-Heinz Graul, Lindlar (DE); Fabian Pritz, Leverkusen (DE); Christian Giesen, Düsseldorf (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/852,790

(22) Filed: Jun. 29, 2022

(65) Prior Publication Data
US 2023/0011089 A1    Jan. 12, 2023

(30) Foreign Application Priority Data
Jul. 6, 2021   (DE) .......................... 102021117443.0

(51) Int. Cl.
*B60J 5/04*   (2006.01)
*B60J 5/06*   (2006.01)

(52) U.S. Cl.
CPC .............. *B60J 5/0458* (2013.01); *B60J 5/06* (2013.01)

(58) Field of Classification Search
CPC .................................. B60J 5/06; B60J 5/0458
USPC ............................................ 296/187.12, 155
See application file for complete search history.

(56) References Cited

U.S. PATENT DOCUMENTS

| | | | |
|---|---|---|---|
| 3,788,686 A * | 1/1974 | Rossie .................. | B60J 5/0458 180/271 |
| 3,819,228 A * | 6/1974 | Cornacchia ............ | B62D 25/04 292/DIG. 65 |
| 4,580,823 A * | 4/1986 | Yamada .................. | E05B 77/10 292/DIG. 46 |
| 8,371,640 B2 | 2/2013 | Horneck et al. | |
| 8,517,450 B2 | 8/2013 | Lange | |
| 2014/0117705 A1* | 5/2014 | Tamaki .................... | B60J 5/042 296/146.6 |

FOREIGN PATENT DOCUMENTS

| | | |
|---|---|---|
| DE | 2033531 | 7/1970 |
| JP | 2004044180 A | 2/2004 |
| JP | 2006035881 A | 2/2006 |
| JP | 4281892 B2 | 3/2009 |

OTHER PUBLICATIONS

German Search Report for Application No. DE102021117443.0 dated May 2, 2022.

* cited by examiner

*Primary Examiner* — Jason S Morrow
(74) *Attorney, Agent, or Firm* — Vichit Chea; Carlson, Gaskey & Olds, P.C.

(57) ABSTRACT

A vehicle door system includes at least one sliding door which is arranged on the side and can be displaced out from the B-pillar. A securing system is provided for latching the sliding door on the B-pillar in the case of an external impact against the B-pillar occurring obliquely from the front. The securing system can block the at least one sliding door from opening in response to the external impact. The securing system includes a catchment claw that engages a securing hook to hold the at least one sliding door to the B-pillar.

9 Claims, 2 Drawing Sheets

VEHICLE DOOR SYSTEM

CROSS-REFERENCE TO RELATED APPLICATIONS

This disclosure claims priority to German Patent Application No. 102021117443.0, which was filed on 6 Jul. 2021 and is incorporated herein by reference in its entirety.

BACKGROUND

A vehicle door system can include at least one sliding door which is arranged on the side, in front of a vehicle door opening, and can be displaced out from a B-pillar towards the rear and locked on the B-pillar. A securing system can be provided for latching the sliding door on the B-pillar in the case of an external impact against the B-pillar occurring obliquely from the front.

United States Patent Application No. 2012/0117886 A1 discloses a known vehicle door system that includes a receiving part provided on the B-pillar, into which a catchment wedge provided on the sliding door engages when the sliding door is closed. In normal operation, the catchment wedge can engage loosely in the receiving part and can withdraw from the receiving part when the sliding door is opened. On the outside of the receiving part is a catchment hook which is fixedly connected thereto, and which, in the case of an external impact on the B-pillar, distorts and engages in a receiving opening of the catchment hook situated in the receiving part. This process directly latches the sliding door to the B-pillar during the impact in which the catchment hook deforms.

SUMMARY

In some aspects, the techniques described herein relate to a vehicle door system, including: a sliding door arranged on a side of a vehicle and displaceable laterally outward from a B-pillar of the vehicle and toward a rear of the vehicle, the sliding door configured to be selectively locked on the B-pillar, the sliding door having an end face that points toward the B-pillar when the sliding door is closed; and a securing system configured to latch the sliding door to the B-pillar in response to an external impact against the B-pillar, the securing system including a securing hook and a catchment claw, the securing hook provided on the end face of the sliding door when the sliding door is closed, the securing hook protrudes into a hollow interior of the B-pillar through a passage opening provided in the B-pillar, the catchment claw arranged in the interior of the B-pillar, the claw configured to avoid contact with the securing hook without an impact against the B-pillar during normal operation of the sliding door, and in response to the external impact against the B-pillar when the sliding door is in a closed position, the catchment claw is configured to move and couple fixedly to the securing hook to holds the sliding door to the B-pillar.

In some aspects, the techniques described herein relate to a vehicle door system, wherein at least a portion of the catchment claw is within the hollow interior and arranged in a region of an outwardly facing inner wall of the B-pillar.

In some aspects, the techniques described herein relate to a vehicle door system, wherein the catchment claw is fixedly connected to the inner wall of the B-pillar.

In some aspects, the techniques described herein relate to a vehicle door system, wherein the securing hook has at least one vertically protruding crosspiece at a front end of a shank, wherein, in response to the external impact against the B-pillar, the catchment claw is configured to engage behind the at least one vertically protruding crosspiece.

In some aspects, the techniques described herein relate to a vehicle door system, wherein the at least one vertical crosspiece includes a vertical crosspiece protruding from opposing sides of the shank to form a T-shaped retaining element.

In some aspects, the techniques described herein relate to a vehicle door system, wherein the catchment claw includes at least two curved gripping fingers arranged vertically above one another, the at least two curved gripping fingers configured to engage behind the crosspiece of the T-shaped retaining element on both sides of the shank in response to an impact against the B-pillar when the sliding door is in a closed position.

In some aspects, the techniques described herein relate to a vehicle door system, wherein the securing hook is disposed on a base plate that is attached to the end face of the sliding door that faces the B-pillar.

In some aspects, the techniques described herein relate to a vehicle door system, wherein the external impact is an external impact occurring obliquely from a front of the vehicle.

In some aspects, the techniques described herein relate to a vehicle door system, including: a B-pillar having a hollow interior; a sliding door that can transition back-and-forth between a closed position and an open position, the sliding door configured to be selectively locked on the B-pillar when in the closed position, the sliding door having an end face that points toward the B-pillar when the sliding door is in closed position; and a securing system including a securing hook and a catchment claw, the securing hook secured to the sliding door and protruding into the hollow interior of the B-pillar when the sliding door is in the closed position, the catchment claw arranged in the hollow interior of the B-pillar, the catchment claw configured to avoid contact with the securing hook without an impact against the B-pillar during normal operation of the sliding door, wherein the B-pillar and the catchment claw are configured to shift relative to the securing hook in response to an external impact load that exceeds a threshold value, the shift configured to cause the catchment claw to coupled fixedly to the securing hook to hold the sliding door to the B-pillar.

In some aspects, the techniques described herein relate to a vehicle door system, wherein the securing hook is T-shaped.

In some aspects, the techniques described herein relate to a vehicle door system, wherein the catchment claw includes at least two curved gripping fingers arranged vertically above one another, the at least two curved gripping fingers configured to engage the securing hook on both sides of a shaft of the securing hook.

In some aspects, the techniques described herein relate to a vehicle door system, wherein the external impact load is an external impact load applied obliquely from a front of the vehicle.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
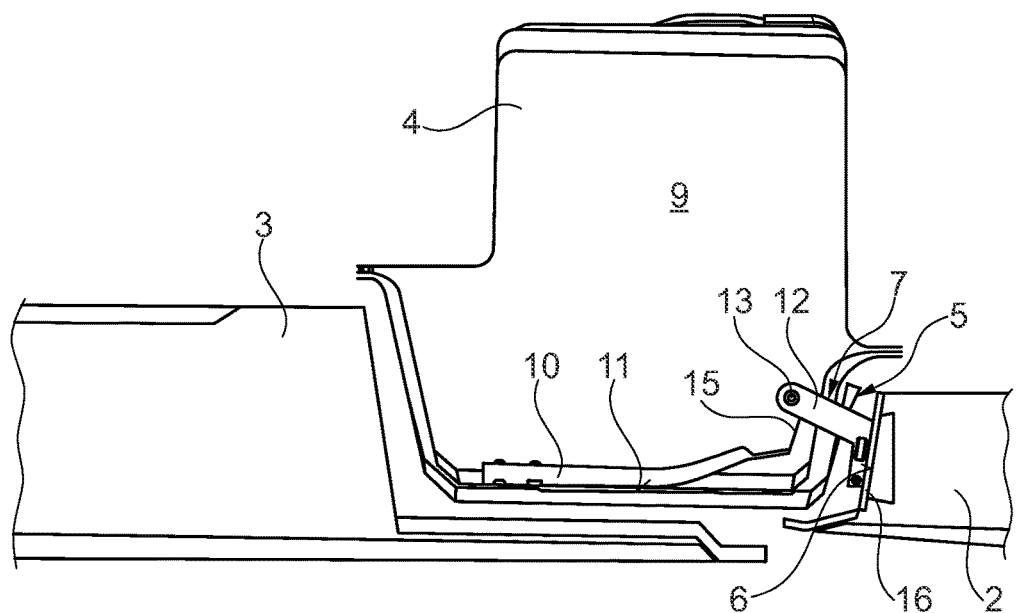
FIG. 1 illustrates a horizontal section through a door system in an undeformed state according to an exemplary embodiment of the present disclosure.

The present disclosure is directed toward a vehicle door system that includes at least one sliding door which is arranged on the side, in front of a vehicle door opening, and can be displaced out from the B-pillar towards a rear of the vehicle and locked on the B-pillar. A securing system is provided for latching the sliding door on the B-pillar in the case of, for example, an external impact against the B-pillar occurring obliquely from the front.

The securing system is in particular characterized in that a securing hook is provided on the end face of the sliding door pointing towards the B-pillar. When the sliding door is closed, the securing hook protrudes into the hollow interior of the B-pillar through a passage opening provided in the B-pillar. A catchment claw is arranged in the interior of the B-pillar. The claw does not come into contact with the securing hook in normal operation of the sliding door. In the case of an impact against the B-pillar when the sliding door is closed, the catchment claw is moved such that it can be coupled fixedly to the securing hook. This holds firmly and thereby latches the sliding door to the B-pillar.

Exemplary embodiments of the securing system can include main elements belonging to the securing system, namely the catchment claw arranged in the interior of the B-pillar and the securing hook provided on the sliding door, that do not deform in a side impact and reliably couple together under a lateral pressure on the B-pillar, The sliding door is thus securely held in its position despite the deformation of the B-pillar.

The catchment claw can be arranged in a region of the outwardly facing inner wall of the hollow B-pillar, so that on deformation, the B-pillar is moved in the direction of the securing hook provided on the sliding door and firmly holds the securing hook, so that the sliding door cannot open.

The catchment claw can be fixedly connected to the inner wall of the hollow B-pillar, so that no additional retaining elements are necessary.

The securing hook of the sliding door, which engages in the hollow interior of the B-pillar, may have at least one vertically protruding crosspiece at the front end of its shank, wherein in the case of an external impact against the B-pillar, the catchment claw arranged in the B-pillar engages by form fit behind said crosspiece. In this way, a reliable securing of the sliding door to the B-pillar is guaranteed.

In an embodiment, the vertical crosspiece arranged on the front end of the securing hook protrudes on both sides of the shank and together therewith forms a T-shaped retaining element. In this embodiment, the catchment claw is provided with two curved gripping fingers arranged vertically above one another, which engage behind the crosspiece of the T-shaped retaining element on both sides of the shank in the case of a collision.

The protruding securing hook, which in the closed state of the sliding door engages in the hollow interior of the B-pillar, suitably sits on a base plate which is fixedly anchored to the end face of the sliding door facing the B-pillar.

Figure 3:
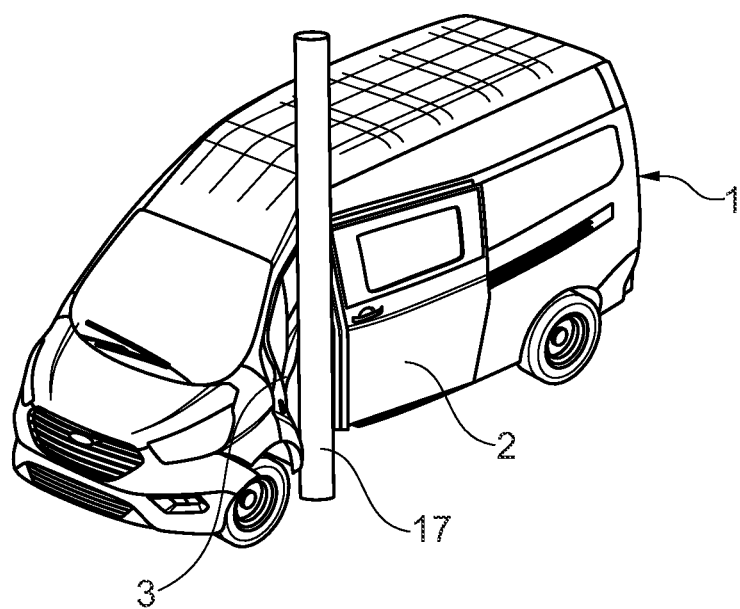
FIG. 3 illustrates the vehicle equipped with a securing system as the vehicle contacts an obstacle obliquely from the front.

With reference to FIG. 3, a vehicle 1 has a rear sliding door 2 and a front pivoting driver's door 3. The vehicle 1 is shown contacting an obstacle 17 obliquely from the front, in the region of its B-pillar 4, which causes the B-pillar 4 to deform.

FIG. 1 shows the region of the B-pillar 4 with the securing system 5 in the undeformed state of the B-pillar 4. Details of the securing system 5 appear in particular in the perspective illustration shown in FIG. 2.

Figure 2:
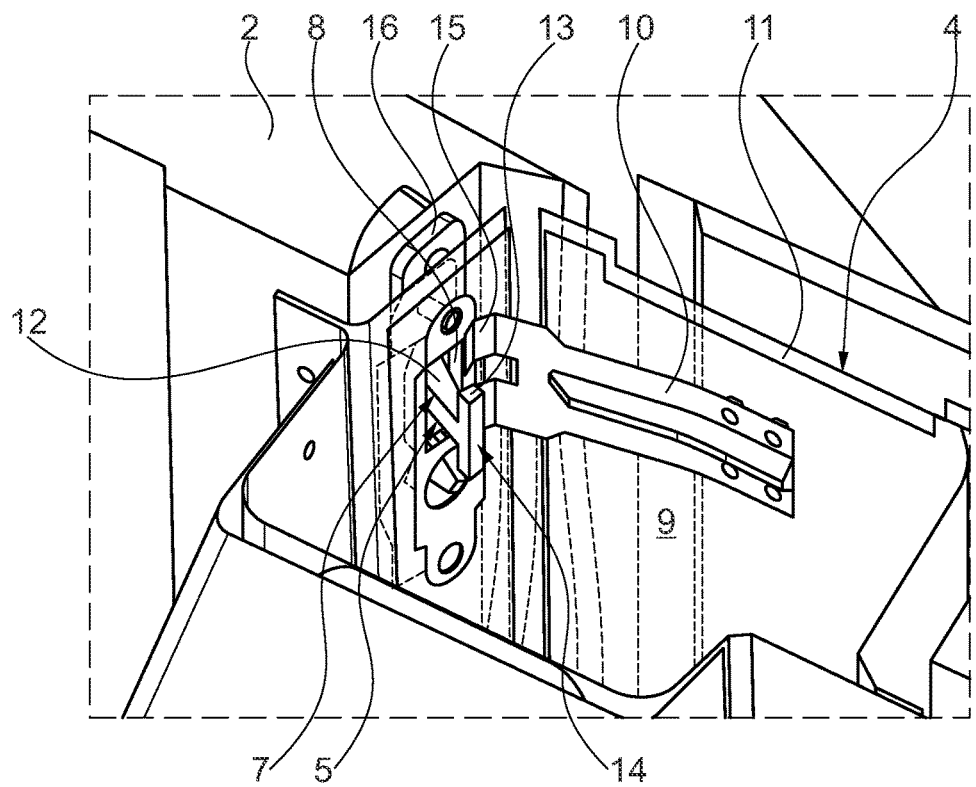
FIG. 2 illustrates a perspective view of the embodiment in FIG. 1 viewed from the inside of a vehicle having the door system.

As evident from FIGS. 1 and 2, the securing system 5 has a securing hook 7 which is provided on the sliding door 2 and fixedly anchored to the end face 6 of the sliding door 2. When the sliding door 2 is closed, this securing hook 7 protrudes into the hollow interior 9 of the B-pillar through a passage opening 8 provided in the B-pillar 4.

The securing system 5 further includes a catchment claw 10 attached to the outwardly facing inner wall 11 of the B-pillar 4 and within the hollow interior 9 of the B-pillar.

The securing hook 7, which is connected to the sliding door 2 and engages in the hollow interior 9 of the B-pillar 4 when the sliding door 2 is closed, is provided with at least one vertically protruding crosspiece 13 at the front end of it shank 12. In the case of an external impact against the B-pillar 4, the catchment claw 10 arranged in the B-pillar 4 engages by form fit behind said crosspiece 13.

In the exemplary embodiment, the vertical crosspiece 13 protrudes on both sides of the shank 12, and together with the shank 12 forms a T-shaped retaining element 14. To facilitate gripping this T-shaped retaining element 14, the catchment claw 10 attached to the inner wall 11 of the hollow B-pillar 4 has two curved gripping fingers 15 arranged vertically above one another, so that they can engage behind the crosspiece 13 of the T-shaped retaining element 14 on both sides of the shank 12 in the case of a collision, and thus firmly hold the securing hook 7 in the interior of the B-pillar. In this way, even in the case of a side impact, the sliding door 2 remains fixedly connected to the B-pillar 4.

As shown in FIGS. 1 and 2, the securing hook 7 connected to the sliding door 2 sits on a base plate 16, which is attached to the end face 6 of the sliding door 2 facing the B-pillar 4.

Figure 4:
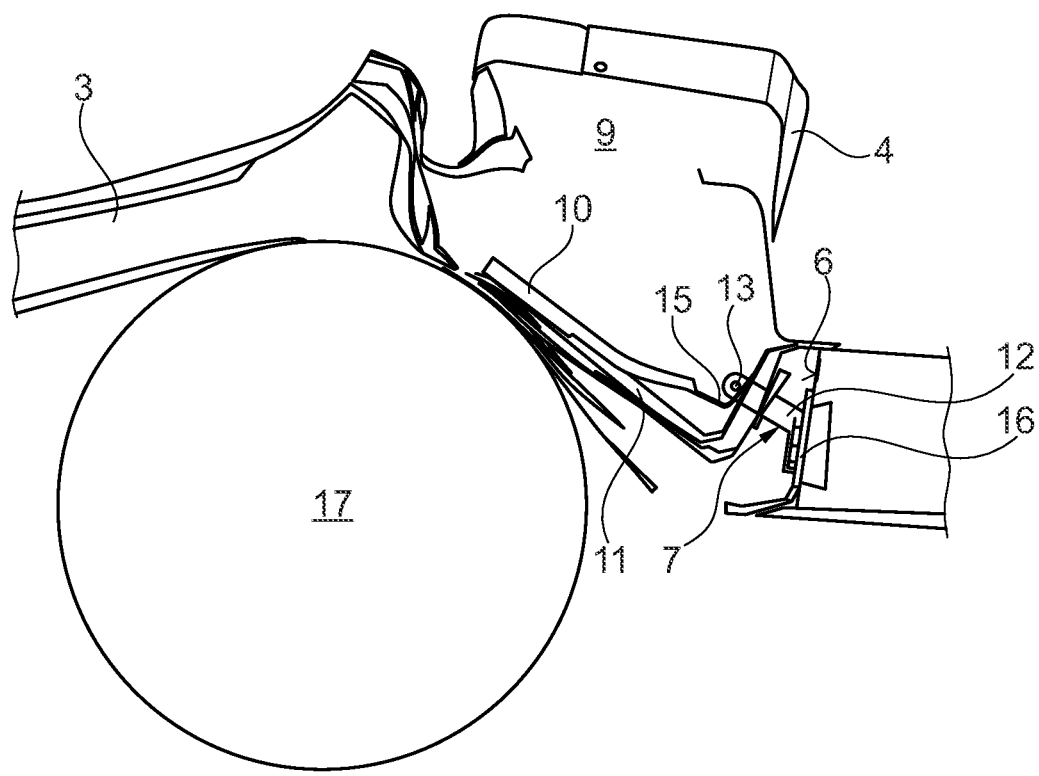
FIG. 4 illustrates the horizontal section of FIG. 1, in which the B-pillar has been deformed by the impact and the securing system activated.

FIG. 4 shows how the securing system 5 can behave in the case of a side impact. The obstacle 17, for example a post or bollard of largely round cross-section, deforms the B-pillar 4 on impact by pushing this in the direction of the interior of the vehicle 1. The entire B-pillar 4 is thereby deformed, wherein in particular the outwardly facing inner wall 11 of the hollow B-pillar 4 is pressed inward. The movement of the inner wall 11 of the hollow B-pillar 4 also pushes the catchment claw 10 inward, so that the gripping fingers 15 of the catchment claw 10 come into contact with the T-shaped retaining element 14. The two gripping fingers 15 engage around the crosspiece 13 on both sides and thus hold the securing hook 7, which is connected to the sliding door 2, fixedly in the interior 9 of the B-pillar 4. Because of this fixing, the sliding door 2 cannot open in the case of an impact but is fixedly and reliably latched to the B-pillar 4.

The teachings of this disclosure are not restricted to the exemplary embodiment described in connection with FIGS.

1 to 4. Further variants are possible in which the catchment claw and securing hook have other designs, for example.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle door system, comprising:
a sliding door arranged on a side of a vehicle and displaceable laterally outward from a B-pillar of the vehicle and toward a rear of the vehicle, the sliding door configured to be selectively locked on the B-pillar, the sliding door having an end face that points toward the B-pillar when the sliding door is closed; and
a securing system configured to latch the sliding door to the B-pillar in response to an external impact against the B-pillar, the securing system including a securing hook and a catchment claw,
the securing hook provided on the end face of the sliding door when the sliding door is closed, the securing hook protrudes into a hollow interior of the B-pillar through a passage opening provided in the B-pillar,
the catchment claw arranged in the interior of the B-pillar, the claw configured to avoid contact with the securing hook without an impact against the B-pillar during normal operation of the sliding door, and
in response to the external impact against the B-pillar when the sliding door is in a closed position, the catchment claw is configured to move and couple fixedly to the securing hook to holds the sliding door to the B-pillar,
wherein the securing hook has at least one vertically protruding crosspiece at a front end of a shank,
wherein, in response to the external impact against the B-pillar, the catchment claw is configured to engage behind the at least one vertically protruding crosspiece,
wherein the at least one vertical crosspiece includes a vertical crosspiece protruding from opposing sides of the shank to form a T-shaped retaining element.

2. The vehicle door system of claim 1, wherein at least a portion of the catchment claw is within the hollow interior and arranged in a region of an outwardly facing inner wall of the B-pillar.

3. The vehicle door system of claim 2, wherein the catchment claw is fixedly connected to the inner wall of the B-pillar.

4. The vehicle door system of claim 1, wherein the catchment claw includes at least two curved gripping fingers arranged vertically above one another, the at least two curved gripping fingers configured to engage behind the crosspiece of the T-shaped retaining element on both sides of the shank in response to an impact against the B-pillar when the sliding door is in a closed position.

5. The vehicle door system of claim 1, wherein the securing hook is disposed on a base plate that is attached to the end face of the sliding door that faces the B-pillar.

6. The vehicle door system of claim 1, wherein the external impact is an external impact occurring obliquely from a front of the vehicle.

7. A vehicle door system, comprising:
a B-pillar having a hollow interior;
a sliding door that can transition back-and-forth between a closed position and an open position, the sliding door configured to be selectively locked on the B-pillar when in the closed position, the sliding door having an end face that points toward the B-pillar when the sliding door is in closed position; and
a securing system including a securing hook and a catchment claw, the securing hook secured to the sliding door and protruding into the hollow interior of the B-pillar when the sliding door is in the closed position, the catchment claw arranged in the hollow interior of the B-pillar, the catchment claw configured to avoid contact with the securing hook without an impact against the B-pillar during normal operation of the sliding door, wherein the B-pillar and the catchment claw are configured to shift relative to the securing hook in response to an external impact load that exceeds a threshold value, the shift configured to cause the catchment claw to coupled fixedly to the securing hook to hold the sliding door to the B-pillar, wherein the securing hook is T-shaped.

8. A vehicle door system, comprising:
a B-pillar having a hollow interior;
a sliding door that can transition back-and-forth between a closed position and an open position, the sliding door configured to be selectively locked on the B-pillar when in the closed position, the sliding door having an end face that points toward the B-pillar when the sliding door is in closed position; and
a securing system including a securing hook and a catchment claw, the securing hook secured to the sliding door and protruding into the hollow interior of the B-pillar when the sliding door is in the closed position, the catchment claw arranged in the hollow interior of the B-pillar, the catchment claw configured to avoid contact with the securing hook without an impact against the B-pillar during normal operation of the sliding door, wherein the B-pillar and the catchment claw are configured to shift relative to the securing hook in response to an external impact load that exceeds a threshold value, the shift configured to cause the catchment claw to coupled fixedly to the securing hook to hold the sliding door to the B-pillar,
wherein the catchment claw includes at least two curved gripping fingers arranged vertically above one another, the at least two curved gripping fingers configured to engage the securing hook on both sides of a shaft of the securing hook.

9. The vehicle door system of claim 7, wherein the external impact load is an external impact load applied obliquely from a front of the vehicle.

* * * * *